United States Patent
Fraser et al.

[11] Patent Number: 6,102,680
[45] Date of Patent: Aug. 15, 2000

[54] SUCTION VALVE WITH RELEASE TIMING CHAMBER

[75] Inventors: Bruce A. Fraser, Manlius; Michael J. Dormer, Fabius, both of N.Y.

[73] Assignee: Carrier Corporation, Syracuse, N.Y.

[21] Appl. No.: 09/108,360

[22] Filed: Jul. 1, 1998

[51] Int. Cl.$^7$ .................................................. F04B 39/10
[52] U.S. Cl. .......................... 417/569; 417/433; 137/856; 137/246
[58] Field of Search ..................... 417/432, 433, 417/569, 571; 137/246, 856, 246.12, 246.13; 251/355

[56] References Cited

U.S. PATENT DOCUMENTS

| | | | |
|---|---|---|---|
| 1,583,535 | 5/1926 | Dubrovin | 417/433 |
| 1,834,038 | 12/1931 | Summers . | |
| 2,001,885 | 5/1935 | Ohmart . | |
| 2,020,508 | 11/1935 | Knapp . | |
| 2,110,107 | 3/1938 | Drysdale . | |
| 2,372,938 | 4/1945 | Doeg . | |
| 2,981,462 | 4/1961 | Niedermayer . | |
| 4,522,568 | 6/1985 | Gelse et al. . | |
| 4,580,604 | 4/1986 | Kawaguchi et al. | 137/856 |
| 4,628,963 | 12/1986 | Ishijima et al. | 137/856 |
| 4,642,037 | 2/1987 | Fritchman | 137/856 |
| 4,955,797 | 9/1990 | Cowen . | |
| 5,035,050 | 7/1991 | Cowen . | |
| 5,062,779 | 11/1991 | Da Costa | 137/856 |
| 5,203,686 | 4/1993 | Scheldorf et al. . | |
| 5,452,994 | 9/1995 | Erickson | 417/550 |
| 5,609,476 | 3/1997 | Kim et al. | 417/447 |
| 5,839,472 | 11/1998 | Shintoku et al. | 137/856 |
| B1 4,406,590 | 11/1985 | Kessler . | |

FOREIGN PATENT DOCUMENTS

| | | | |
|---|---|---|---|
| 0 231 955 A2 | 5/1984 | European Pat. Off. | 137/856 |
| 60-7371 | 1/1985 | Japan | 137/856 |
| 60-7372 | 1/1985 | Japan | 137/856 |
| 2-26713 | 6/1990 | Japan | 137/856 |
| 2-61631 | 12/1990 | Japan . | |

*Primary Examiner*—Charles G. Freay
*Assistant Examiner*—Cheryl J. Tyler

[57] ABSTRACT

In addition to seating on its valve seat during the combined compression and discharge stroke, the suction valve seats on the structure associated with the valve seat which has at least one shallow recessed area. In seating on its valve seat, the suction valve seats on the structure defining the shallow recesses to trap fluid therein. The recesses serve to reduce the area available for adhesion and the trapped fluid pressure provides an opening bias to the suction valve. If necessary, or desired, restricted communication between the compression chamber and the shallow recess can take place to provide a higher pressure in the recess at the time of transition from discharge to suction.

6 Claims, 4 Drawing Sheets

SUCTION VALVE WITH RELEASE TIMING CHAMBER

BACKGROUND OF THE INVENTION

In positive displacement compressors employing suction and discharge valves there are both similarities and differences between the two types of valves. Normally the valves would be of the same general type. Each valve would be normally closed and would open due to a pressure differential across the valve in the direction of opening. The valve may be of a spring material and provide its own seating bias or separate springs may be employed. Since the suction valve(s) open into the compression chamber/cylinder they generally do not have valve backers in order to minimize the clearance volume and thus deflection of the valve is not physically limited. Discharge valves normally have some sort of valve backer so as to avoid excess movement/flexure of the discharge valve. Ignoring the effects of leakage, etc., an equal mass of gas is drawn into the compression chamber and discharged therefrom. However, the suction stroke takes place over, nominally, a half cycle whereas the combined compression and discharge stroke makes up, nominally, a half cycle. In the case of the suction stroke, the suction valve opens as soon as the pressure differential across the suction valve can cause it to unseat. Typically, the pressure differential required to open the suction valve is on the order of 15–35% of the nominal suction pressure. In the case of the compression stroke, compression continues with the attendant reduction in volume/increase in density of the gas being compressed until the pressure of the compressed gas is sufficient to overcome the combined system pressure acting on the discharge valve together with spring bias of the valve member and/or separate springs. Typically, the pressure differential required to open the discharge valve is on the order of 20–40% of the nominal discharge pressure. Accordingly, the mass flow rate is much greater during the discharge stroke.

By design, suction valves have a much lower seating bias than discharge valves. The low seating bias is essential due to the fact that valve actuation is initiated by the force resulting from the pressure differential across the valve. In the case of suction valves, opening generally occurs at pressures that are much lower than in the case of discharge valves. Therefore, only small pressure differences, and hence small opening forces, can be created for suction valves relative to potential pressure differences and opening forces for discharge valves. Even a small increase in the pressure differential across the suction valve results in a large percentage increase in the pressure differential across the valve. In contrast, an equal increase in the pressure differential across the discharge valve results in a much smaller percentage increase in the pressure differential because of the substantially higher nominal operating pressure.

The opening force, F, on a valve is given by the equation $$F = P \cdot A$$

where P is the pressure differential across the valve and A is the valve area upon which P acts. It should be noted that the direction in which the pressure differential acts changes during a complete cycle so that, during a portion of a cycle, the pressure differential provides a valve seating bias. When A is held constant, it is clear that a change in F is proportional to a change in P, or, more specifically, the percentage change in F is proportional to the percentage change in P. For example, assuming an operating condition where suction pressure is 20 psia and discharge pressure is 300 psia, at a typical overpressure value of 35%, the cylinder will rise to 405 psia before the discharge valve opens. In contrast, at a typical underpressure value of 30%, the cylinder pressure will drop to 14 psia, before the suction valve opens. If the pressure differential required to open both valves is increased by 10 psia, the discharge overpressure value increases to 38% from 35% while the suction underpressure value increases to 80% from 30%. Thus, we can expect the opening force on the suction valve to increase 167%.

Particularly because of the effects of the clearance volume, the change in pressure differential across the suction valve would not increase very rapidly since the cylinder is initially charged due to the compressed gas from the clearance volume and is then acting as a vacuum pump until the suction valve opens. Specifically, the inflow of gas to the cylinder is typically designed to occur during the last 95% of the combined expansion and suction stroke. In contrast, the compression chamber pressure rises rapidly as the compression stroke is being completed and the pressure can continue to rise during the discharge stroke if the volume flow exiting the cylinder does not match the rate of reduction in the compression chamber volume. Typically, the outflow of gas from the cylinder occurs during the last 40% of the combined compression and discharge stroke. Any substantial change in one or more of these relationships can result in operational problems relative to the valves.

Another complicating factor arises from the fact that under typical operating conditions, lubricating fluid (oil) coats all internal surfaces of a compressor, including the suction and discharge valves and valve seats. The associated problems as to improving discharge efficiency as related to the discharge valve have been addressed in U.S. Pat. No. 4,580,604. In the case of a discharge valve, the cylinder pressure must overcome the system pressure acting on the discharge valve, the spring bias on the valve and any adhesion of the valve to the seat. Accordingly, the adhesion of the discharge valve to the seat represents an over pressure and therefore an efficiency loss.

A typical reciprocating compressor will have a valve plate with an integral suction port and suction valve seat. When in the closed position, the film of oil present between the suction valve and its seat is very thin, on the order of a few molecular diameters. This is in part due to the fact that compression chamber pressure acts on and provides a seating bias for the suction valve during the combined compression and discharge stroke. In normal operation, the opening force applied to the suction valve is provided by a pressure differential across the valve that is created as the piston moves away from the valve during the suction stroke. Typically, the opening force needs to be large enough to overcome the resistance to opening caused by valve mass (inertia) and any spring or other biasing forces. The force also needs to be substantial enough to dilate and shear the oil film trapped between the valve and seat. Factors that influence the force necessary to dilate and shear the lubricant film include: the viscosity of the lubricant film, the thickness of the oil film, the intermolecular attractive forces between the lubricant molecules, the quantity of refrigerant entrained in the oil film, the materials of construction of the suction valve and/or valve seat, and the rate of refrigerant outgassing.

In traditional refrigerant-compressor applications using mineral-based (MO) or alkylbenzene (AB) lubricants, the resistance to opening caused by the lubricants is negligible as indicated by the relatively small pressure differential that is required to initiate valve opening. This is due, in large part, to the fact that MO and AB lubricants exhibit relatively low viscosity, low inter-molecular forces and good solubility with refrigerants over the entire range of operating conditions.

Newer, ozone-friendly refrigerant-compressor applications utilize polyol ester (POE) lubricants. When compared to MO or AB lubricants, POE lubricants can exhibit extremely high lubricant viscosity and poor solubility with HFC refrigerants such as R134a, R404A, and R507, particularly under low operating pressures and/or temperatures. The relatively high viscosity of POE's can cause a substantial increase in the force necessary to dilate and shear the oil film trapped between the valve and seat. Additionally, POE lubricants are very polar materials and hence have a strong molecular attraction to the polar, iron-based materials that are typically used to manufacture valves and valve seats. The mutual attraction of the materials of construction and the POE further increases the force necessary to separate the valve from the valve seat.

In order to generate the increase in force needed to separate the suction valve from its valve seat, the pressure differential across the valve must be increased with an accompanying delay in the valve opening time. When the suction valve does finally open, it does so at a very high velocity. Further, aggravating this condition is the increase in the volume flow rate of the suction gas entering the cylinder resulting from the delay in the suction valve opening. The increase in the volume flow rate of the suction gas causes an increase in suction gas velocity which, in turn, increases the opening force applied to the suction valve and, hence, the velocity at which the valve opens. The increased suction valve opening velocity resulting from the combined effects of a higher pressure differential on the valve due to the delayed opening and the higher volumetric flow rate of the flow impinging upon the suction valve causes the suction valve to deflect further than intended into the cylinder bore. Without the benefit of a valve backer, as would be present in a discharge valve, valve operating stress must increase as a result of the increase in valve deflection. If the operating stress exceeds the apparent fatigue strength of the valve, then valve failure will occur.

SUMMARY OF THE INVENTION

The present invention makes use of the fact that compression chamber pressure acts on and provides a seating bias to the suction valve. While it is obvious that the suction valve must coact with its seat to achieve a valving action, it may also coact with the valve plate or other structure associated with the valve seat. Specifically, according to the teachings of the present invention, the valve coacts with the structure associated with the valve seat to trap volumes of pressurized fluid which act on and provide an opening bias to the valve at the end of the discharge stroke.

It is an object of this invention to reduce the effects of adhesion between a suction valve and its valve seat.

It is an additional object of this invention to reduce operating stress on a suction valve.

It is a further object of this invention to provide a biased open compressor suction valve having an opening bias in an operating compressor.

It is another object of this invention to facilitate the release of a suction valve from its valve seat earlier in the suction stroke. These objects, and others as will become apparent hereinafter, are accomplished by the present invention.

Basically, in addition to seating on its valve seat during the combined compression and discharge stroke, the suction valve seats on the structure associated with the valve seat which has at least one shallow recessed area. In seating on its valve seat, the suction valve seats on the structure defining the shallow recesses to trap fluid therein. The recesses serve to reduce the area available for adhesion and the trapped fluid pressure provides an opening bias to the suction valve. If necessary, or desired, restricted communication between the compression chamber and the shallow recess can take place to provide a higher pressure in the recess at the time of transition from discharge to suction.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
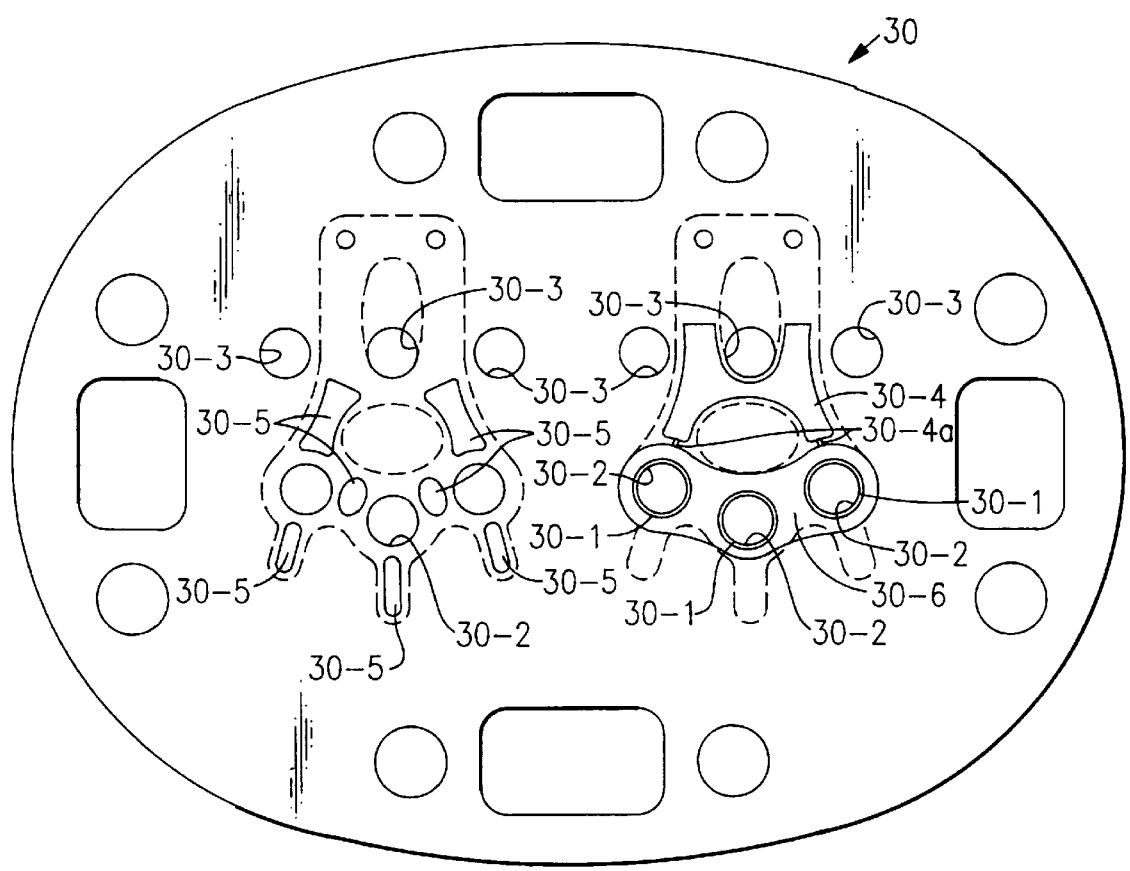
FIG. 1 is a cylinder side view of a valve plate showing two embodiments of the present invention.
Figure 2:
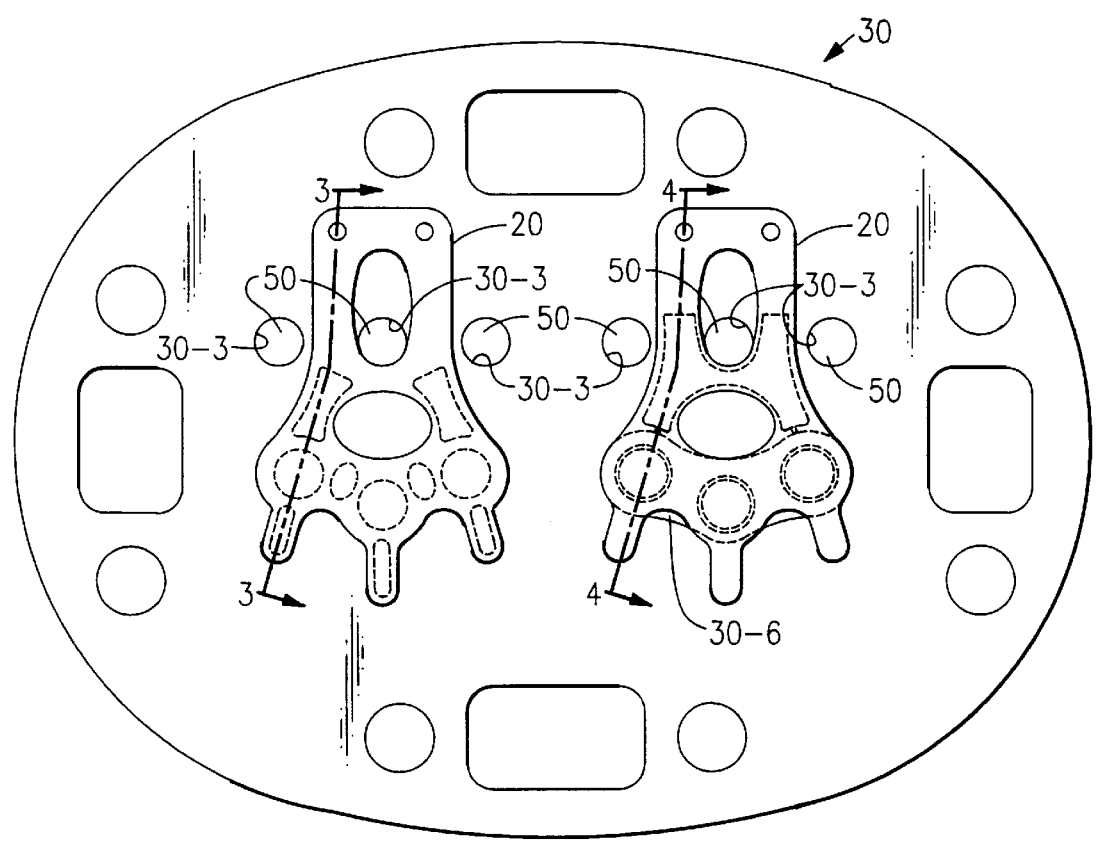
FIG. 2 is the same as FIG. 1 but with the suction and discharge valves added.

In FIGS. 1 and 2, the numeral 30 generally designates a valve plate of a reciprocating compressor. Referring specifically to FIG. 1, two embodiments of the present invention are illustrated with the associated suction valves shown in phantom. The two embodiments, as illustrated, are alternatives and would not be employed in the same compressor but their illustration in the same figures facilitates comparison. One, or more, suction passages 30-2 and discharge passages 30-3 would be associated with each cylinder. In the case of the embodiment illustrated on the left-hand side of FIGS. 1 and 2, a number of shallow recesses 30-5 are formed which are spaced from suction passages 30-2 and discharge passages 30-3 and are covered by suction valve 20 when in its seated position. Accordingly, the entire suction valve 20 on the left side of FIG. 2 will seat on and be in contact with valve plate 30 except for those areas defined by suction passages 30-2, and shallow recesses 30-5.

In the case of the embodiment illustrated on the right-hand side of FIGS. 1 and 2, a conventional trepan 30-6 is stamped or machined in the surface of valve plate 30 leaving a generally kidney shaped recess with annular valve seats 30-1 raised relative to trepan 30-6 so as to be at the level of the surface of valve plate 30. This embodiment adds shallow recess 30-4 which is illustrated as of an H-shape and in restricted fluid communication with trepan 30-6 via notches 30-4a. When suction valve 20 of this embodiment is seated it will engage annular suction valve seats 30-1 and a limited area of valve plate 30, as compared to the left-hand side embodiment.

Figure 3:
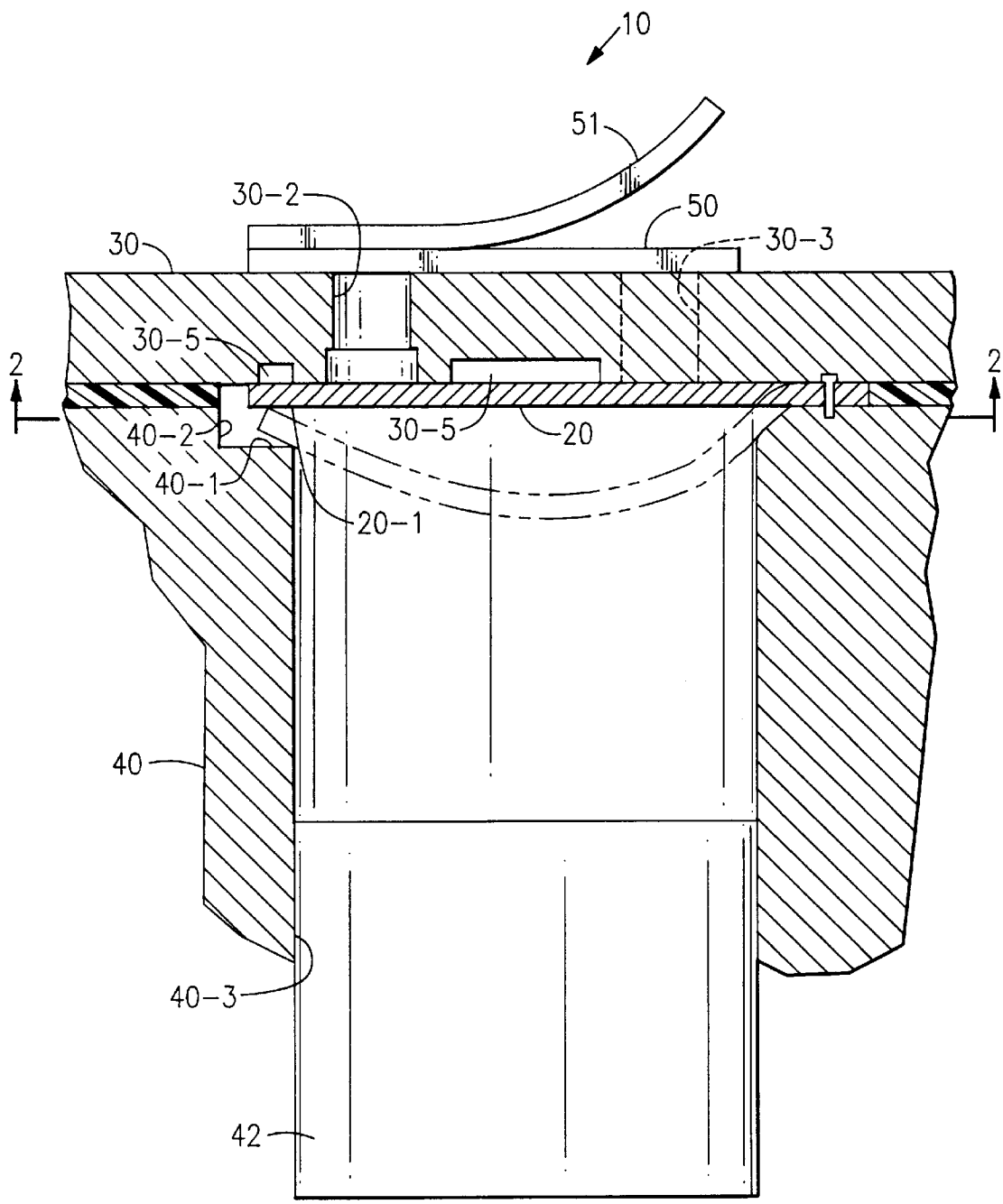
FIG. 3 is a partially sectioned view of a compressor taken along a line generally corresponding to line 3—3 of FIG. 2.
Figure 4:
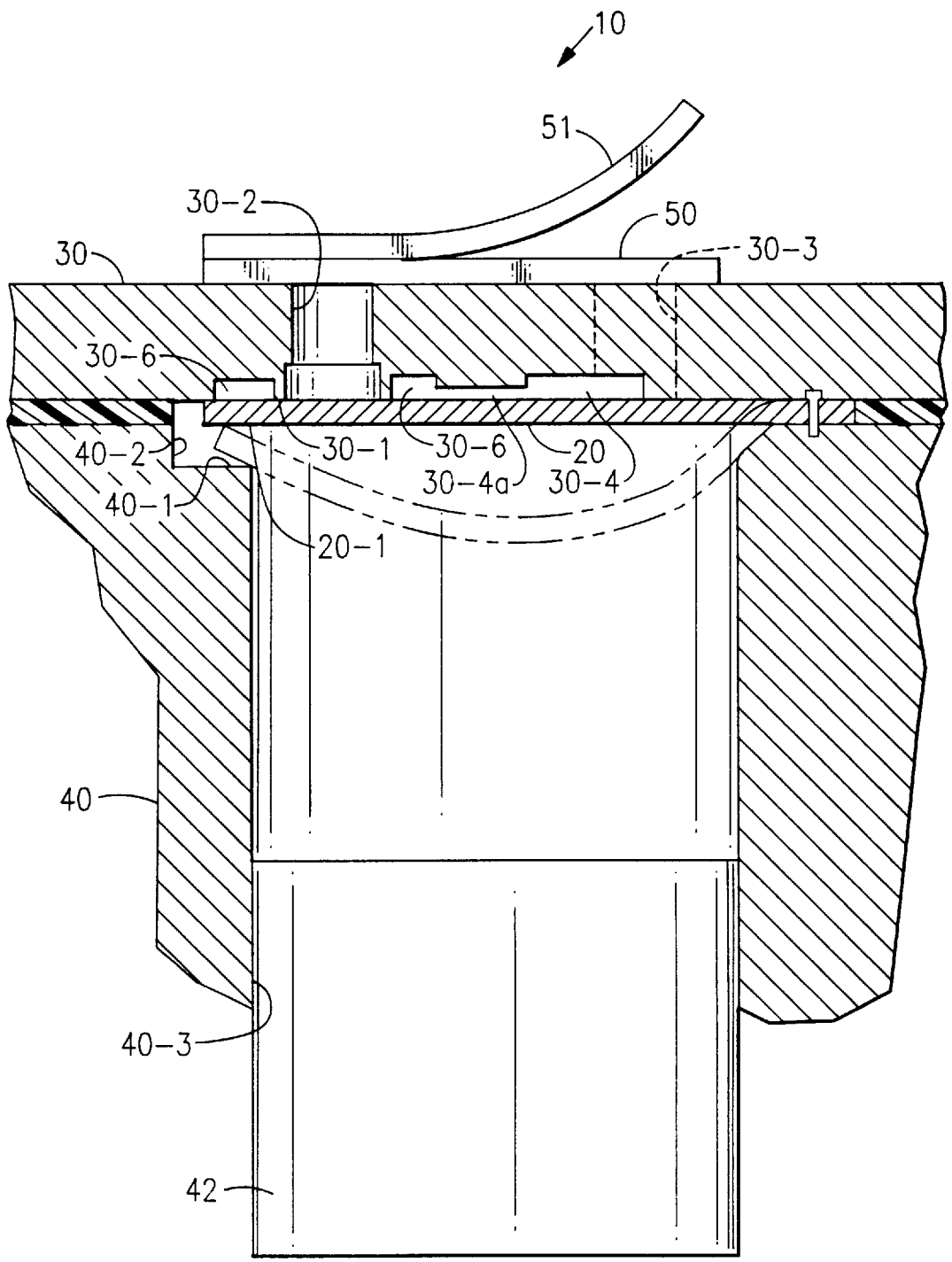
FIG. 4 is a partially sectioned view of a compressor taken along a line generally corresponding to line 4—4 of FIG. 2.

In FIGS. 3 and 4, the numeral 10 generally designates a reciprocating compressor with FIGS. 3 and 4 respectively illustrating two cylinders of compressor 10 each employing a different embodiment of the present invention, as described above. As, is conventional, each cylinder of compressor 10 has a suction valve 20 and a discharge valve 50, which are illustrated as reed valves, as well as a piston 42 which is located in bore 40-3. Valves 20 and 50 coact with valve plate 30 in their valving action. Discharge valve 50 has a backer 51 which limits the movement of valve 50 and is normally configured to dissipate the opening force applied to valve 50 via discharge passages 30-3 over its entire opening movement. When the valve 20 is in the open position, tips 20-1 engage ledges 40-1 in recesses 40-2 in crankcase 40 which act as valve stops. Ledges 40-1 are engaged after an opening movement on the order of 0.1 inches, in order to minimize the clearance volume, with further opening movement by flexure of valve 20 as shown in phantom. Specifically, movement of valve 20 is as a cantilevered beam until tips 20-1 engage ledges 40-1 and then flexure is in the form of a beam supported at both ends. As shown in phantom in FIGS. 3 and 4, valves 20 move into bore 40-3.

As noted above, FIGS. 1 and 2 illustrate two embodiments of the present invention. On the right had side, as viewed in FIGS. 1 and 2 and shown in section in FIG. 4, recess or pocket 30-4 is generally H-shaped and includes one or more restricted passages 30-4a which are not sealed by suction valve 20, as best shown in FIG. 4. On the left-hand side, as viewed in FIGS. 1 and 2 and shown in section in FIG. 3, the suction valve 20 coacts with a plurality of recesses or pockets 30-5 of varying shapes dictated by the size and location of passages 30-2 and 30-3 as well as the size and shape of suction valve 20. Recesses or pockets 30-4 and 30-5 are on the order of 0.005 to 0.015 inches in depth. To minimize the volume of recesses or pockets 30-4 and 30-5 which, effectively, adds to the clearance volume, the shallower depths are preferred. The area of recesses or pockets 30-4 and 30-5, however, should be relatively large to minimize the seating area of suction valve 20 and to maximize the area of suction valve 20 acted on by the fluid in pockets 30-4 and 30-5.

In operation, suction valve 20 is unseated during the suction stroke when the pressure differential across valve 20 is sufficient to overcome the inherent spring force of valve 20, adhesion forces, etc. Valve 20 remains unseated from valve plate 30 or from valve seats 30-1 until the suction stroke is completed and the pressure differential favoring flow into the cylinder defined by bore 40-3, piston 42 and valve plate 30 is reduced to zero. The changeover from the suction stroke, where the suction chamber is expanding, to the compression stroke, where the volume defining the cylinder becomes the compression chamber and starts to be reduced in volume with an accompanying increase in pressure, is essentially instantaneous. Obviously, if there is not a corresponding, essentially instantaneous, seating of the suction valve 20 with the end of the suction stroke/start of the compression stroke, there will be a leakage of the fluid from the compression chamber with attendant losses. Accordingly, by design, suction valve 20 will nominally seat on plate 30 or on valve seat 30-1, depending upon the embodiment, in the absence of a fluid pressure differential across valve 20. In going from the suction stroke to the compression stroke the direction of the pressure differential reverses and the pressure in the compression chamber defined by bore 40-3, valve plate 30 and piston 42 provides a seating bias to suction valve 20. During the compression stroke the fluid pressure acting on suction valve 20 can go from 20 psia to over 300 psia. The high pressure, eg. 300 psia, will continue during the discharge stroke. At the end of the discharge stroke there is an essentially instantaneous transition from discharge to suction with the pressure change being tempered by the clearance volume.

It is clear that during a half cycle defined by the combined compression and discharge stroke there is a fluid pressure differential acting on the suction valve 20 to provide a seating bias. According to the teachings of the present invention shallow recess 30-4 in the case of one embodiment or shallow recesses 30-5 in the case of another embodiment are present and suction valve 20 in seating on valve plate 30 or on valve seats 30-1 also seats on the portion of valve plate 30 surrounding recesses 30-4 or 305. The seating, as explained above, takes place at the start of the compression cycle but the combined compression and discharge stroke collectively makes up half of a cycle. If during the combined compression and discharge stroke at least some of the increased pressure is communicated to recess 30-4, as via restricted passage 30-4a, or to recesses 30-5 due to restricted passages (not illustrated) or due to leakage, recesses 30-4 or 30-5 will be pressurized at the end of the discharge stroke. The change from the discharge stroke to the suction stroke is essentially instantaneous but with the change in the pressure acting on the suction valve somewhat tempered due to the clearance volume which is at discharge pressure and feeds into the expanding suction chamber.

Since the pressure recesses 30-4 and 30-5 would have been brought up to their final pressure during the half cycle and the reversal in pressure differential very swift, even allowing for the effects of the trapped volume, recesses 30-4 or 30-5 are pressurized at the start of the suction stroke. This is based upon the fact that the restricted feed path defined by passage 30-4a or the feed or leakage paths (not illustrated) to recesses 30-5 cannot accommodate an essentially instantaneous depressurization of recesses 30-4 or 30-5. Accordingly, the relatively high pressure trapped in recesses 30-4 or 30-5 at the start of the suction stroke provides an opening bias to suction valve 20.

As discussed above, the POE lubricants tend to cause adhesion between valve 20, valve plate 30 and seats 30-1 formed in valve plate 30. This fluid pressure bias due to the trapped high pressure fluid tends to offset some, if not all, of the adhesion effects such that the opening of valve 20 on the suction stroke is essentially responsive solely to the differential fluid pressure across the valve. Absent the adhesion reduction of the present invention, valve 20 would open at a higher differential pressure and tend to strike ledges or stops 40-1 at a higher velocity such as to facilitate flexure into bore 40-3 which, when coupled with the impinging flow from suction passages 30-2 can cause flexure of valve 20 beyond its yield strength and/or drive valve so far into bore 40-3 that tips 20-1 slip off of ledge or stops 40-1.

Although preferred embodiments of the present invention have been illustrated and described, other changes will occur to those skilled in the art. It is therefore intended that the scope of the present invention is to be limited only by the scope of the appended claims.

What is claimed is:

1. In a reciprocating compressor having a cylinder with a piston therein, a valve plate having a valve port and defining a suction valve seat, a suction valve adapted to move in and out of seating engagement with said valve seat and lubricated by an oil which forms an oil film between said suction valve and said valve seat with at least a portion of said oil film being no more than a few molecular diameters thick, the improvement comprising:

at least one shallow recess formed in said valve plate separate from said valve port and sealed by said suction valve when said suction valve is seated on said valve seat whereby pressurized fluid trapped in said at least one recess provides an opening bias to said suction valve at the start of a suction stroke of said compressor.

2. The improvement of claim 1 further including means for providing restricted fluid communication to said at least one recess when said suction valve is seated on said suction valve seat.

3. The improvement of claim 1 wherein said recess is in the order of 0.005 to 0.015 inches in depth.

4. In a reciprocating compressor having a cylinder with a piston therein, a valve plate having a valve port, a suction valve adapted to move in and out of seating engagement with said valve plate and lubricated by an oil which forms an oil film between said suction valve and said valve plate with at least a portion of said oil from being no more than a few molecular diameters thick, the improvement comprising:

at least one shallow recess formed in said valve plate separate from said valve port and sealed by said suction valve when said suction valve is seated o said valve plate whereby pressurized fluid trapped in said at least one recess provides an opening bias to said suction valve at the start of a suction stroke of said compressor.

5. The improvement of claim 4 further including means for providing restricted fluid communication to said at least one recess when said suction valve is seated on said valve plate.

6. The improvement of claim 4 wherein said recess is in the order of 0.005 to 0.015 inches in depth.

* * * * *